(12) United States Patent
Sovine et al.

(10) Patent No.: US 11,085,362 B2
(45) Date of Patent: Aug. 10, 2021

(54) CHARGE AIR COOLER SHROUD WITH ACCESS PANEL

(71) Applicant: FORD GLOBAL TECHNOLOGIES, LLC, Dearborn, MI (US)

(72) Inventors: Michael Brett Sovine, Canton, MI (US); Erin Gibb, Belle River (CA); Robert Eugene Otterman, LaSalle (CA)

(73) Assignee: Ford Global Technologies, LLC, Dearborn, MI (US)

( * ) Notice: Subject to any disclaimer, the term of this patent is extended or adjusted under 35 U.S.C. 154(b) by 1075 days.

(21) Appl. No.: 14/978,093

(22) Filed: Dec. 22, 2015

(65) Prior Publication Data
US 2017/0175617 A1    Jun. 22, 2017

(51) Int. Cl.
*F02B 29/04* (2006.01)
*F01P 11/10* (2006.01)

(52) U.S. Cl.
CPC ......... *F02B 29/0431* (2013.01); *F01P 11/10* (2013.01); *F02B 29/0456* (2013.01); *Y02T 10/12* (2013.01)

(58) Field of Classification Search
CPC ...... F01P 11/10; F01P 3/20; F01P 1/06; F01P 5/02; F02B 29/0431; F02B 29/0456
USPC ....................................... 123/41.49; 165/121
See application file for complete search history.

(56) References Cited

U.S. PATENT DOCUMENTS

| | | | | |
|---|---|---|---|---|
| 4,592,437 A | * | 6/1986 | Holm | F01P 11/12 160/105 |
| 6,106,228 A | * | 8/2000 | Bartlett | F01P 11/10 123/41.11 |
| 6,189,492 B1 | * | 2/2001 | Brown | B60S 1/50 123/41.49 |
| 8,436,576 B2 | * | 5/2013 | Toya | H02J 7/025 320/108 |
| 2008/0073055 A1 | | 3/2008 | Inniger et al. | |
| 2008/0236518 A1 | | 10/2008 | Schaffer et al. | |
| 2009/0129922 A1 | * | 5/2009 | Cloft | B64D 29/08 415/213.1 |
| 2014/0138066 A1 | * | 5/2014 | Bibb, III | F28F 9/002 165/121 |
| 2014/0147257 A1 | | 5/2014 | Sasinowski et al. | |

FOREIGN PATENT DOCUMENTS

GB            1451514 A      10/1976

* cited by examiner

*Primary Examiner* — Syed O Hasan
(74) *Attorney, Agent, or Firm* — David Coppiellie; King & Schickli, PLLC

(57) ABSTRACT

A charge air cooler shroud is provided. That charge air cooler shroud includes a main body having an access opening and a removable access panel carried on the main body and covering the access opening. A method is also disclosed for mounting a cooling module to a frame of a motor vehicle.

4 Claims, 6 Drawing Sheets

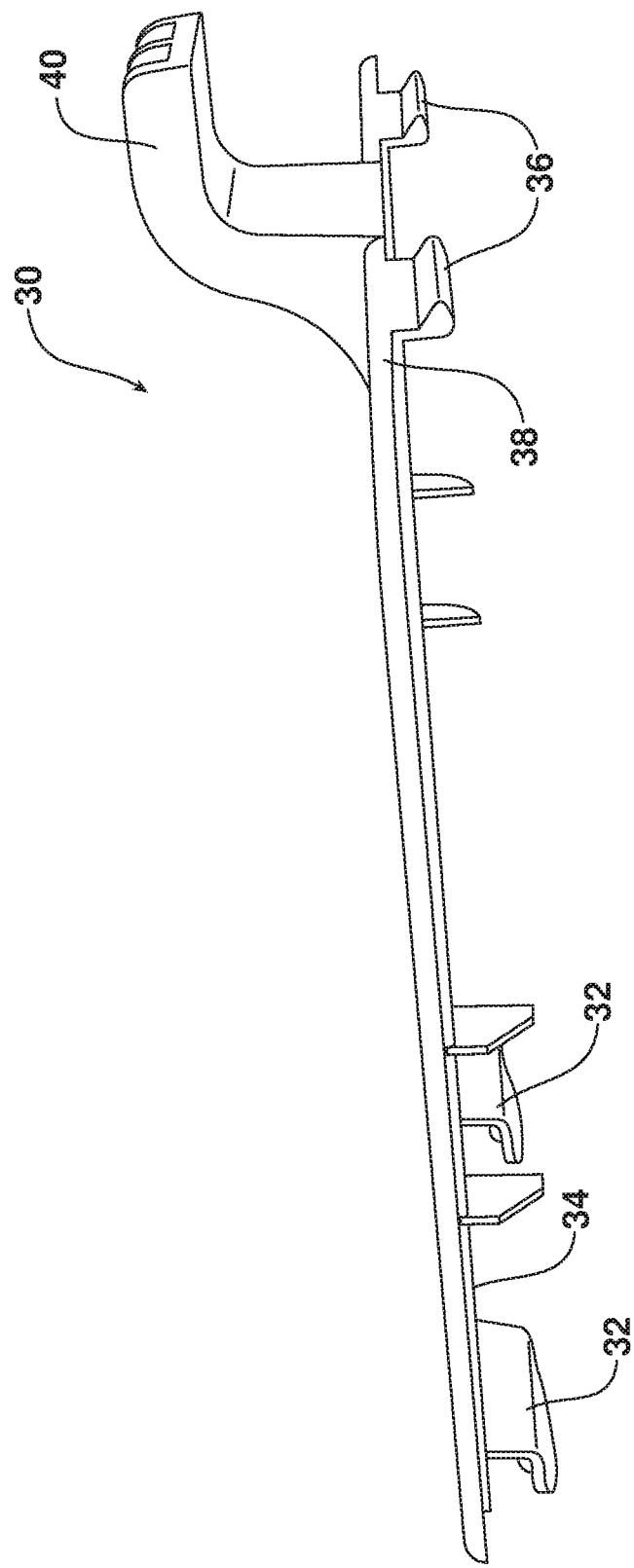

CHARGE AIR COOLER SHROUD WITH ACCESS PANEL

TECHNICAL FIELD

This document relates generally to the motor vehicle equipment field, and more particularly, to a charge air cooler shroud incorporating a removable access panel.

BACKGROUND

A number of component assemblies and modules are installed in the engine bay of a motor vehicle. Space limitations often restrict the clearance available when completing such installations. This document relates to a new and improved charge air cooler shroud incorporating an access opening that allows one to reach through the shroud and access the mechanical fan swivel so that the mechanical fan swivel may be repositioned from a stowed position, which provides clearance for installation, to a proper operating position around the engine mounted fan. Subsequently, a removable access panel is secured to the main body of the charge air cooler shroud so as to close the access opening and provide the desired aerodynamic performance.

SUMMARY

In accordance with the purposes and benefits described herein, a charge air cooler shroud is provided. That charge air cooler shroud comprises a main body including an access opening and a removable access panel carried on the main body and covering the access opening.

More specifically, the removable access panel includes at least one mounting flange along a first edge and at least one snap lug along a second edge. That at least one mounting flange may be opposed to the at least one snap lug.

Further, the removable access panel may include a finger hold adjacent the at least one snap lug.

In one possible embodiment, the access opening is provided in a bottom wall of the main body. In one possible embodiment, the second edge is oriented in the vehicle rearward of the first edge toward a rear wall of the main body.

In accordance with an additional aspect, a method is provided of mounting a cooling module to the frame of a motor vehicle. That method may be described as comprising the steps of (1) installing the cooling module to the frame of the motor vehicle with a mechanical fan swivel on the cooling module in a stowed position to provide clearance for installation and (2) displacing the mechanical fan swivel into an operating position following installation. The method may further include the step of reaching through the access opening in a charge air cooler shroud of the cooling module in order to engage the mechanical fan swivel and displace the mechanical fan swivel into the operating position. In addition, the method may include closing the access opening by securing an access panel to the charge air cooler shroud across the access opening. In one possible embodiment, the method also includes snapping the access panel into the access opening in order to complete the connection of the access panel to the charge air cooler shroud.

In the following description, there are shown and described several preferred embodiments of the charge air cooler shroud. As it should be realized, the charge air cooler shroud is capable of other, different embodiments and its several details are capable of modification in various, obvious aspects all without departing from the charge air cooler shroud as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the charge air cooler shroud and together with the description serve to explain certain principles thereof. In the drawing figures:

FIG. 1 is a partially cross-sectional and schematic side elevational view illustrating a cooling module for a motor vehicle incorporating a charge air cooler shroud and a mechanical fan swivel. The mechanical fan swivel is illustrated in full line in the stowed position where it provides clearance for installation of the cooling module. The mechanical fan swivel is also illustrated in phantom line in the operating position in which it is locked for proper motor vehicle operation.

FIGS. 4A and 4B are two illustrations of the removable access panel that is secured to the main body of the charge air cooler shroud in order to close the access opening following the displacing of the mechanical fan swivel from the stowed position to the operating position.

Reference will now be made in detail to the present preferred embodiments of the charge air cooler shroud, examples of which are illustrated in the accompanying drawing figures.

DETAILED DESCRIPTION

Figure 1:
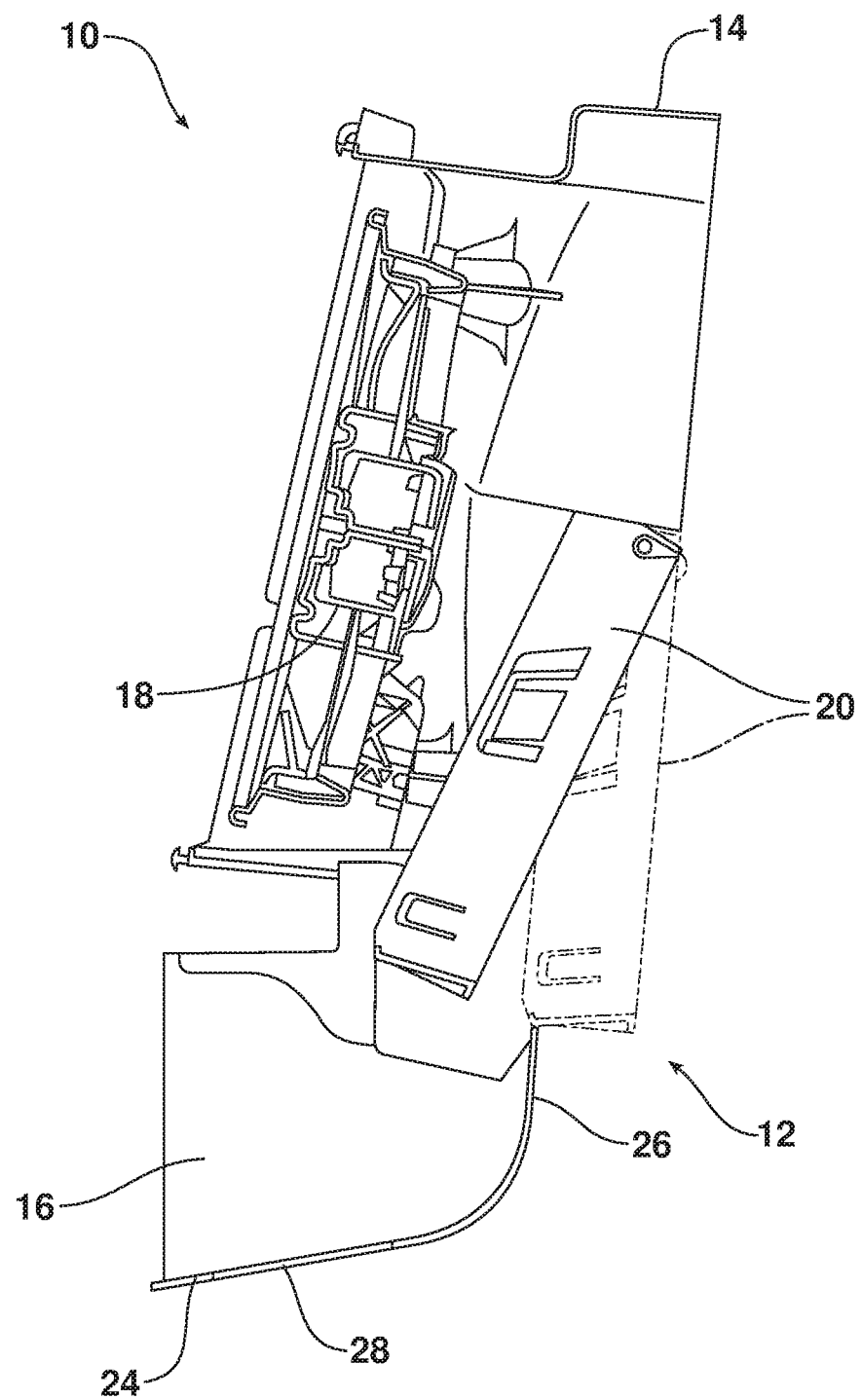
Figure 2:
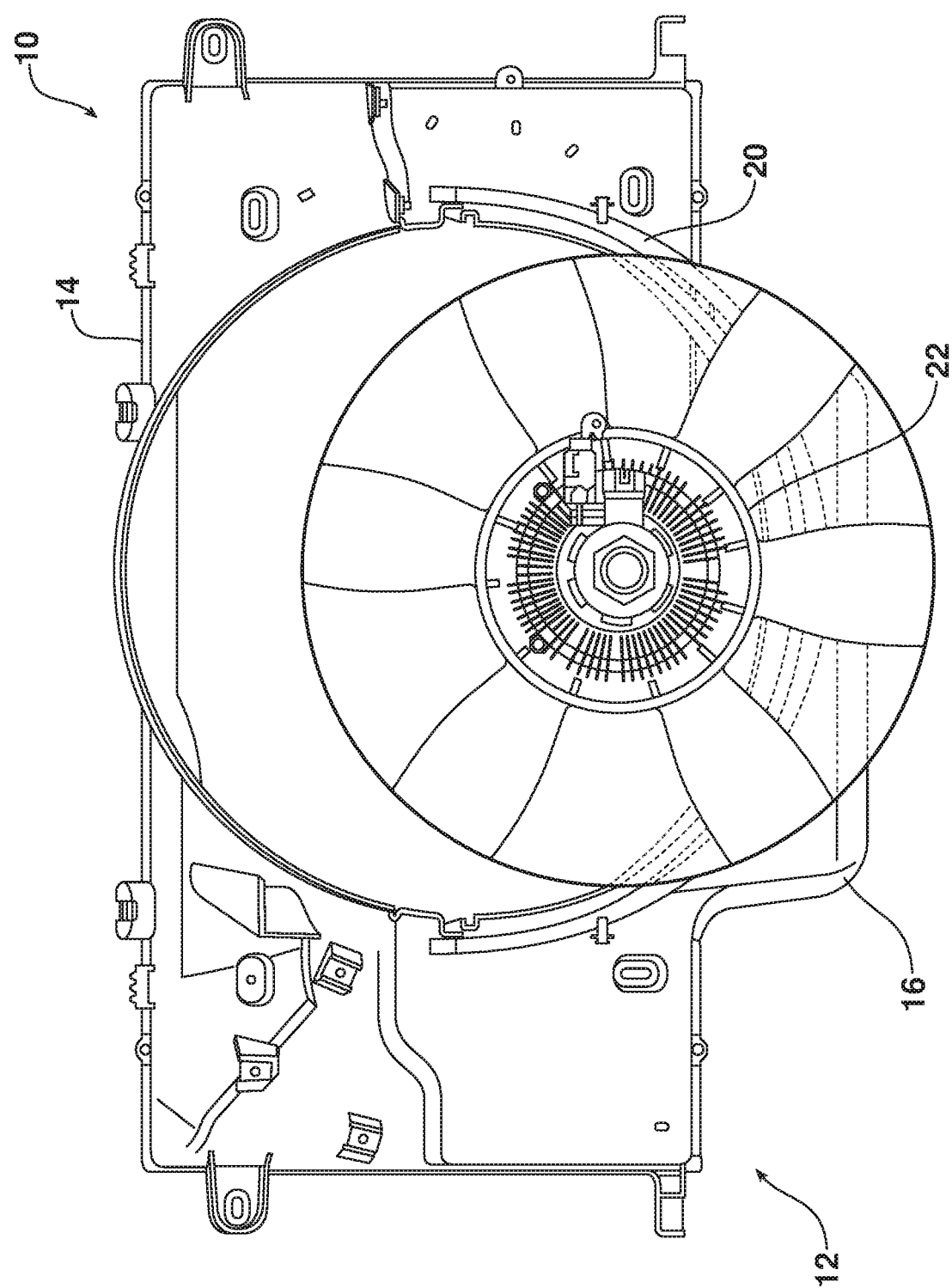
FIG. 2 is a schematic view of a portion of the cooling module showing how it is installed over an engine mounted fan. During installation the mechanical fan swivel is in the stowed position to provide the necessary clearance to complete the installation process.

Reference is now made to FIG. 1 illustrating a cooling module, generally designated by reference numeral 10. The cooling module 10 includes a shroud assembly 12 comprising a first section or fan shroud 14 and a second section or charge air cooler shroud 16. As illustrated, the cooling module 10 includes an electric radiator fan 18 held within the fan shroud 14. Further, a mechanical fan swivel 20 is pivotally connected to the fan shroud 14 and is displaceable between a stowed position illustrated in full line and an operating position illustrated in phantom line. As will become apparent from the following description, the mechanical fan swivel 20 is provided in the stowed position in order to provide additional clearance for the installation of the cooling module 10 into the engine compartment of the motor vehicle. Subsequent to installation, the mechanical fan swivel 20 is displaced into and locked in the operating position where it extends around the mechanical or engine mounted cooling fan 22. FIG. 2 illustrates the cooling module 10 being positioned with respect to the mechanical or engine mounted cooling fan 22. Note the mechanical fan swivel 20 pivoted forward in the stowed position to provide additional clearance for the installation operation.

Figure 3:
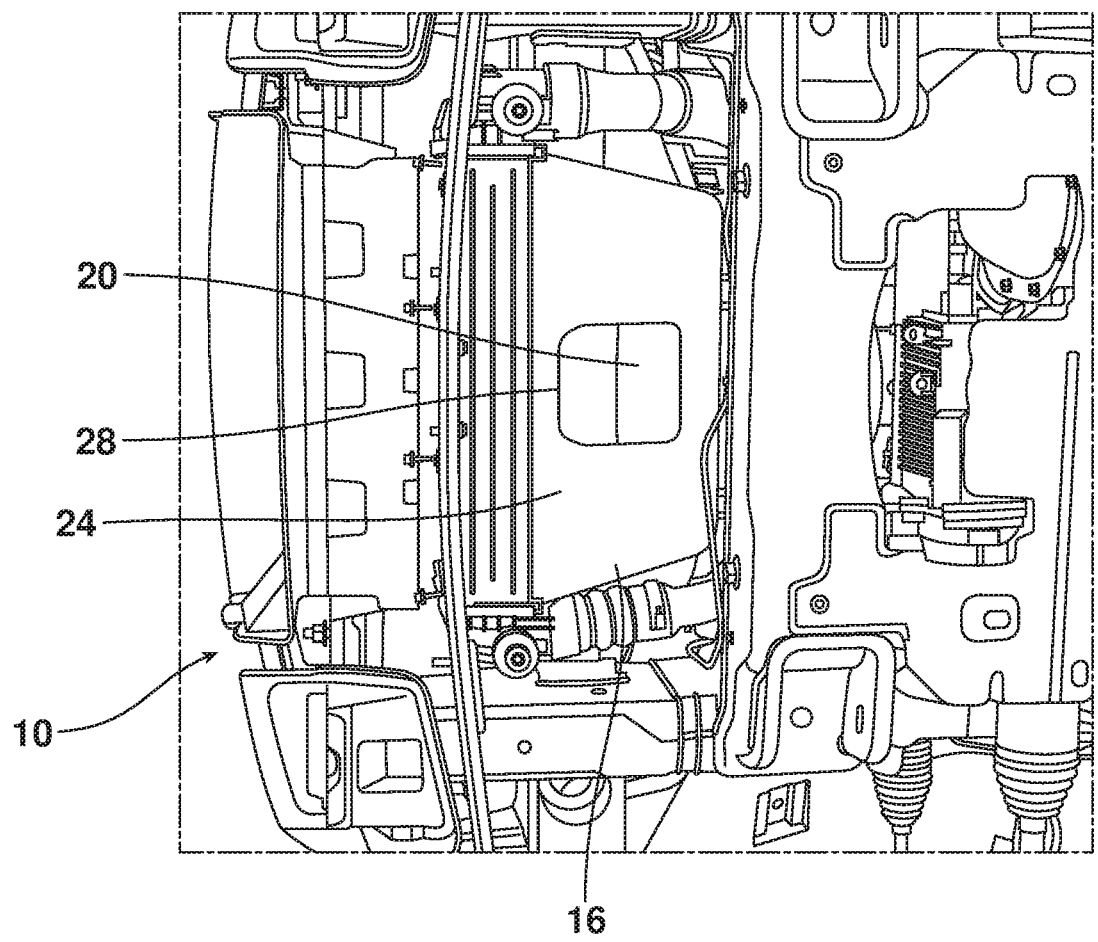
FIG. 3 is a bottom plan view illustrating the access opening in the charge air cooler shroud that allows one to reach through the opening to engage the mechanical fan swivel in the stowed position and displace and lock the mechanical fan swivel in the operating position.
Figure 5:
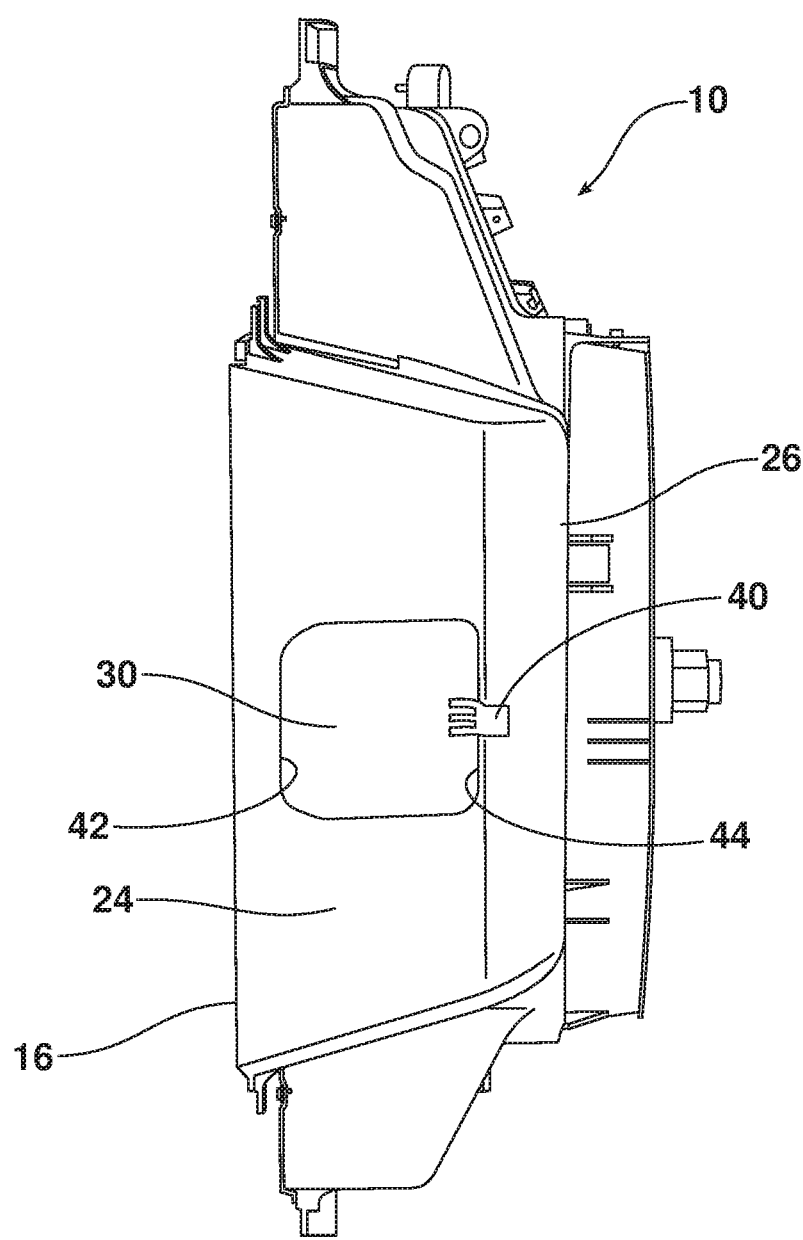
FIG. 5 is a bottom plan view illustrating the access panel secured to the main body of the charge air cooler shroud and fully closing the access opening.

As illustrated in FIGS. 1 and 3, the charge air cooler shroud 16 includes a main body having a bottom wall 24 and a rear wall 26. As illustrated, an access opening 28 is provided in the bottom wall 24. The access opening 28 is large enough to allow an assembly line worker to reach through the access opening 28, engage the mechanical fan swivel 20 in the stowed position and displace the mechanical fan swivel 20 into the operating position following installation of the cooling module 10 onto the frame of the motor vehicle within the engine compartment. The mechanical fan swivel 20 is then locked in the operating position. Following installation of the cooling module and displacing of the mechanical fan swivel 20 into the operating position, an access panel 30 is secured in the bottom wall 24 of the charge air cooler shroud 16 so as to close the access opening 28 and thereby provide the desired air flow through the cooling module 10. See FIG. 5 showing the access panel 30 secured in position and closing the access opening.

Figure 4B:
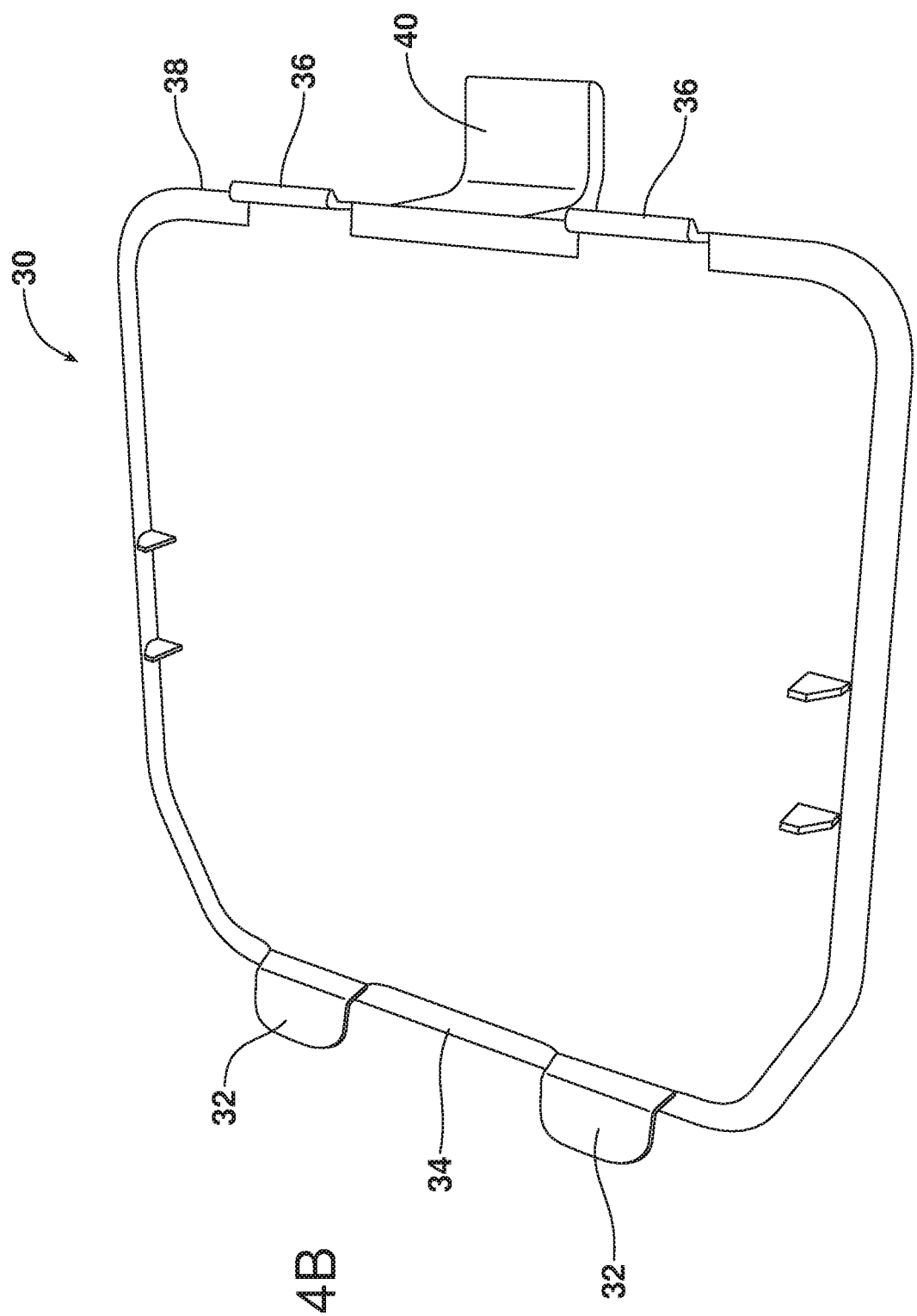

Reference is now made to FIGS. 4A and 4B which are detailed views of the access panel 30. In the illustrated embodiment, the removable access panel 30 includes two mounting flanges 32 along a first edge 34 and two snap lugs 36 along a second edge 38. As illustrated, the first edge 34 is opposed to the second edge 38 and the mounting flanges 32 are opposed to the snap lugs 36.

As further illustrated in FIGS. 4A and 4B, the removable access panel 30 also includes a finger hold 40 in the form of an L-shaped ear. The finger hold 40 is provided along the second edge 38 of the access panel 30 between the two snap lugs 36.

The removable access panel 30 is secured to the charge air cooler shroud 16 by inserting the mounting flanges 32 into the access opening 28 and positioning those flanges to overly the vehicle forward margin 42 of the access opening 28. The removable access panel 30 is then pivoted upwardly to snap the lugs 36 past the vehicle rearward margin 44 of the access opening so that the removable access panel 30 fits into and closes the access opening 28. As illustrated, the snap lugs 36 of the access panel 30 are oriented vehicle rearward toward the rear wall 26 of the charge air cooler shroud 16 which provides additional strength to resist any possible bending of the charge air cooler shroud 16 during the installation of the removable access panel 30.

As should be appreciated from the above description, the charge air cooler shroud 16 disclosed herein is useful in a method of mounting a cooling module 10 to a frame of a motor vehicle. That method may be described as including the steps of installing the cooling module 10 to the frame of the motor vehicle with a mechanical fan swivel 20 on the cooling module in a stowed position to provide clearance for installation. This is followed by the step of displacing the mechanical fan swivel 20 into an operating position. Toward this end, the method includes the step of reaching through an access opening 28 in the charge air cooler shroud 16 in order to engage the mechanical fan swivel 20 and displace the mechanical fan swivel into the operating position. This is followed by the closing of the access opening 28 by securing a removable access panel 30 to the charge air cooler shroud 16 across the access opening. This may be done by snapping the access panel 30 into the access opening 28 where the access panel is securely held in position by the opposed mounting flanges 32 and snap lugs 36. A projecting finger hold 40 provided on the removable access panel 30 allows one to subsequently remove the access panel and open the access opening 28 should that ever be necessary for maintenance or service.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method of mounting a cooling module to a frame of a motor vehicle, comprising:
    installing said cooling module to said frame of said motor vehicle with a mechanical fan swivel on said cooling module in a stowed position to provide clearance for installation;
    displacing said mechanical fan swivel into an operating position following installation; and
    reaching through an access opening in a charge air cooler shroud of said cooling module in order to engage said mechanical fan swivel and displace said mechanical fan swivel into said operating position.

2. The method of claim 1, including closing said access opening by securing an access panel to said charge air cooler shroud across said access opening.

3. The method of claim 2, including snapping said access panel into said access opening.

4. The method of claim 3, including providing a projecting finger hold on said access panel to assist in removal of said access panel from said access opening.

* * * * *